No. 674,440. Patented May 21, 1901.
T. F. FLINN.
STEAM PUMP.
(Application filed May 28, 1900.)
(No Model.)
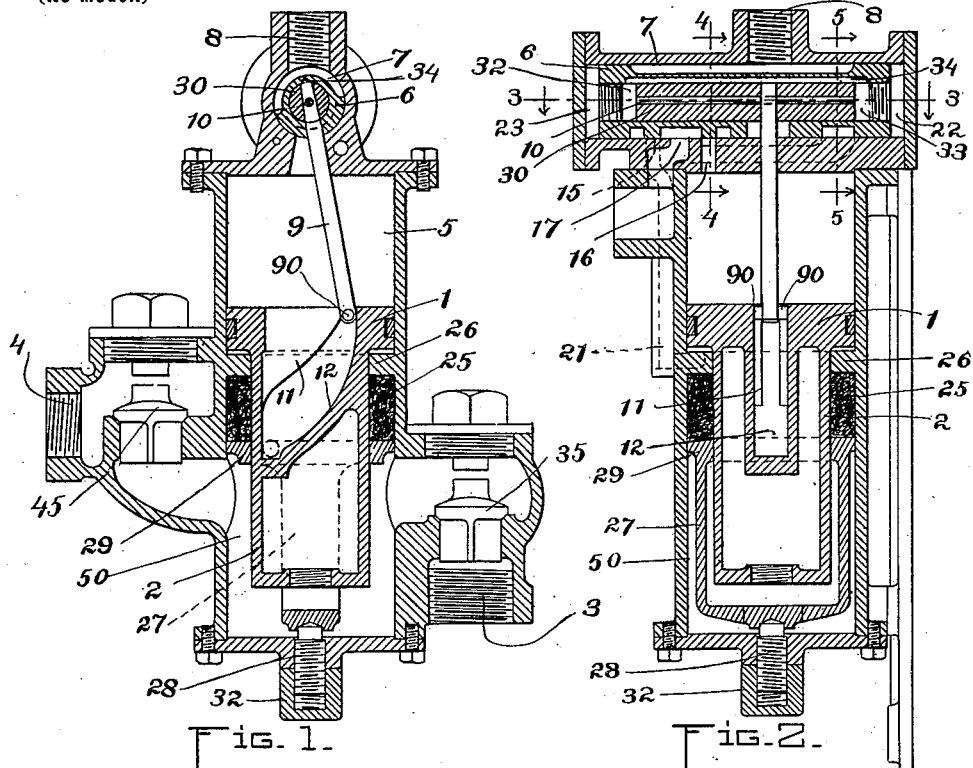
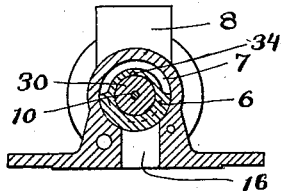
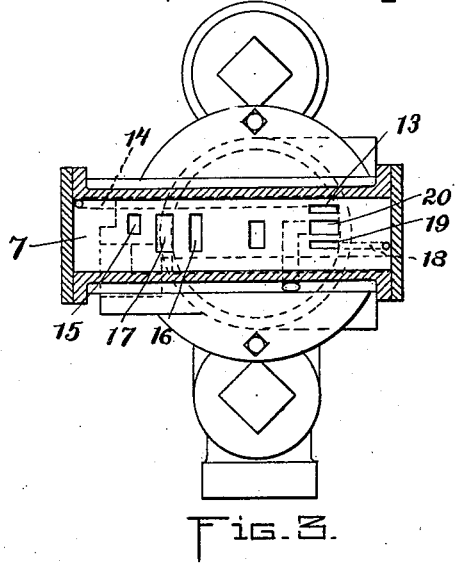
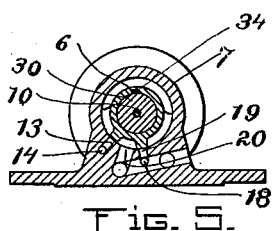
Witnesses:
A. D. Harrison
P. J. Ezzith
Inventor:
T. F. Flinn
by Hught Brown & Quinby
attys.
THE NORRIS PETERS CO., PHOTO-LITHO., WASHINGTON, D. C.

UNITED STATES PATENT OFFICE.

THOMAS F. FLINN, OF BROOKLYN, NEW YORK.

STEAM-PUMP.

SPECIFICATION forming part of Letters Patent No. 674,440, dated May 21, 1901.

Application filed May 28, 1900. Serial No. 18,255. (No model.)

*To all whom it may concern:*

Be it known that I, THOMAS F. FLINN, of New York, borough of Brooklyn, in the county of Kings and State of New York, have invented certain new and useful Improvements in Steam-Pumps, of which the following is a specification.

My invention relates to steam-pumps, and has for its object to provide a simplified and efficient pump as a substitute for small injectors in feeding water to boilers of relatively small size.

The invention consists, first, in certain improvements hereinafter described whereby a single packing or stuffing box is enabled to serve both for the steam and water chambers of a steam-pump.

The invention consists also in an improved valve mechanism and in other improvements, all of which I will now proceed to describe and claim.

In the drawings, Figure 1 represents a longitudinal section of a pump embodying my invention. Fig. 2 represents a longitudinal section in a plane perpendicular to the section shown in Fig. 2. Fig. 3 represents a cross-section on line 3 3 of Fig. 2 with the valve removed. Fig. 4 represents a cross-section of valve-chest and valve on line 4 4 of Fig. 2. Fig. 5 represents a cross-section of the valve-chest and valve on line 5 5 of Fig. 2.

The same reference characters indicate the same parts in all the figures.

The casing of the pump comprises a steam chamber or cylinder 5 and a water-chamber 50, which constitutes an extension of the steam-cylinder, and has an inlet 3 and an outlet 4, the inlet and outlet being provided with suitable valves 35 and 45. In the steam-cylinder is fitted a piston 1, with which is connected a plunger 2, projecting into the water-chamber, the piston and plunger being preferably formed as a single part or casting. The upward motion of the piston 1 and plunger 2 draws water through the inlet 3, and the downward motion of the piston and plunger expels the water through the outlet 4. Steam passes through an inlet-pipe 8 into a cylindrical valve-chest 7 at one end of the casing, from which it is admitted to the steam-cylinder 5 through the ports 15 16, controlled by the piston-valve 6. In addition to its end motion the piston-valve 6 has a motion of rotation produced by a rod 9, the upper end of which is secured by a pin 10 in a core 30, on which the piston-valve 6 is capable of sliding. The lower end of the rod 9 projects into the cylinder and has studs 90 90, which engage the cams or cam-shaped guides 11 12 within the interior of the piston and plunger. As the piston 1 rises and descends the lower end of the rod 9 is moved from side to side by the alternate action of said cams, and the piston-valve 6 is rotated through a small angle. When the piston rises, the cam 12 acts on the rod 9, turning the piston-valve 6 in right-handed rotation and uncovering the port 19, thus putting the passage 18 in communication with the valve-chest 7 and permitting steam to flow to the space 22 at the right-hand end of the piston-valve 6, forcing the valve to the left and opening the port 16, which admits steam to the upper end of the cylinder 5. At the same time the port 15 is put into communication with the exhaust-space 17, thus allowing the steam in the lower end of the cylinder to escape through the passage 21. The same motion of rotation that opens the port 19 puts the port 13 into communication with the exhaust-space 20, allowing the steam confined in the space 23 at the left-hand end of the valve to escape through the passage 14 into the air. When the piston descends, the operation is reversed. The valve 6 is rotated left-handedly, opening the port 13 and allowing steam to flow through the passage 14 to the space 23, where it acts on the piston-valve 6, forcing it to the right, opening the port 15, and admitting steam to the lower end of the cylinder 5 through the passage 21, while the port 16 communicates with the exhaust-space 17. While the piston-valve 6 moves endwise the core 30 remains stationary, being held in position by the rod 9. Thus the spaces 32 and 33 between the ends of the core 30 and the end walls of the hollow piston-valve 6 are alternately enlarged and reduced in size. These chambers are filled with steam and communicate with each other through a groove or passage 34 in the side of the piston-valve 6, so that as the valve moves, for instance, to the left, diminishing the volume of the chamber 33, steam flows through the passage 34 into the chamber 32. The passage 34 does not extend quite to the outer walls of the chambers 32 and 33, but terminates at each end within the chamber. Thus after the valve 6 has moved some distance to the left the right-hand end of the core 30 covers the opening to the passage 34 and prevents further escape of steam from the chamber 33. The remaining steam imprisoned in the chamber 33 acts as a cushion and prevents the valve from striking against the end wall of the valve-chest. It also keeps the valve from moving too far and closing the opening to the passage 14, which allows steam to enter the valve-chest and move the piston-valve 6 to the right at the beginning of the downstroke of the pump. As the piston-valve moves to the right steam flows from the chamber 32 into the chamber 33, while the left-hand end of the core 30 cuts off the flow of steam.

Leakage of steam around the plunger 2 is prevented by means of a stuffing-box between the steam and water chambers. Said stuffing-box, as here shown, comprises a flange 26 on the interior of the casing, said flange surrounding the plunger, a gland 29, which is adjustable toward and from the flange 26, and a suitable packing-ring interposed between the gland and flange. The gland is formed on or attached to a yoke 27 and is capable of being adjusted by means of a screw 28, set in the lower wall of the water-chamber and supporting the yoke. The screw 28 is secured at any desired adjustment by a cap-shaped lock-nut 320. The packing-ring 25 may be of compressible material, or it may be an incompressible ring of metal or other suitable material, closely fitting the annular space between the plunger and the wall of the casing. The ring 25 may be entirely dispensed with when low pressures are employed, the gland 29 being pressed directly against the flange 26, the gland being suitably formed to closely fit said annular space.

It will be seen that the means for adjusting the gland from the exterior of the casing enables the gland to be located between the steam and water chambers, so that the entire apparatus requires but one stuffing-box, the gland being conveniently adjusted notwithstanding its inaccessible position.

I am the first, so far as I am aware, to construct a steam-pump having a steam-chamber, a water-chamber, a piston in the steam-chamber, a plunger in the water-chamber connected with the piston, an adjustable packing between the steam and water chambers, and means for adjusting said packing from the exterior of the casing. I believe also that I am the first to construct a piston and plunger in one piece or casting with an internal valve-operating cam for giving the valve one of its movements. This form of pump is better adapted for use with boilers of small power than injectors, as small injectors suitable for boilers supplying engines of from twenty to thirty horse power are liable to give trouble by being too easily choked by obstructions. It also possesses advantages over pumps in which the valve is moved by the piston, as such pumps often give trouble by stopping on account of the valve being moved only far enough to cut off the steam. This happens when the piston moves slowly and has not momentum enough to carry the valve to the point where steam is admitted to the other end of the cylinder. In this case, however, the throw of the valve is independent of the momentum of the piston, as the force acting on it is the same whether the movement of the piston be fast or slow.

I claim—

1. A steam-pump comprising a casing having a steam chamber or cylinder, and a water-chamber, a piston movable in said steam-chamber, a plunger affixed to the piston and movable in the water-chamber, a valve mechanism for controlling the admission and egress of steam to and from the opposite ends of the cylinder, said mechanism including cams affixed to the piston and plunger, the surfaces of said cams being adapted to laterally actuate the steam-valve-controlling means, and valves controlling the entrance and exit of water to and from the water-chamber.

2. A steam-pump comprising a casing having a steam-chamber, a water-chamber in line with the steam-chamber, a piston working in line with the steam-chamber, a plunger projecting from the piston into the water-chamber, and valve-operating cams located within the piston and plunger, the surfaces of said cams being adapted to laterally actuate the operating connections with the valves.

3. A steam-pump comprising a steam-chamber, a valve-casing adjacent to the chamber, a valve in said casing having a combined motion of translation and rotation, a piston movable in the steam-chamber, cams attached to said piston, and connections between said cams and the valve, the surfaces of said cams being adapted to laterally actuate said connections, whereby the movements of the piston are caused to impart movements of rotation to the valve.

4. A steam-pump comprising a steam-chamber, a valve-casing adjacent to the chamber, a valve in said casing having a combined motion of translation and rotation, a piston movable in the steam-chamber, cams attached to said piston, a core on which the valve is adapted to move lengthwise, the core and valve being connected to partially rotate in unison, and a rod connected at one end with the core and adapted at its other end to cooperate with the piston-cams.

5. In a steam pumping-engine, a cylinder, and a piston therein, a piston-valve adapted to partially rotate and to move endwise, a core in said valve on which the valve has its endwise movement, a rod connected with the core, and cams or guides on a reciprocating part of the mechanism, for laterally oscillating said rod and core.

6. In a steam pumping-engine, a cylinder, and a piston therein, and having a piston-valve capable of being partially rotated and of moving endwise, the combination with said valve and the essential parts coacting therewith, of a rod projecting from the valve, and a piston having cams or guides engaging said rod for laterally controlling it.

7. In a steam pumping-engine, a cylinder, a piston therefor, a valve-casing, a piston-valve movable therein, having plugs or heads at its ends, a core in said valve on which the valve has a limited endwise movement, the core being shorter than the distance between the heads of the valve, so that steam-spaces are formed between the heads and the ends of the core, and a steam-passage connecting said spaces, whereby steam is transferred from one space to another, to cushion the valve.

In testimony whereof I have affixed my signature in presence of two witnesses.

THOMAS F. FLINN.

Witnesses:
C. F. BROWN,
A. D. HARRISON.